May 5, 1931.  H. W. GOETZ ET AL  1,803,608
SPIDER
Filed March 26, 1928  2 Sheets-Sheet 1
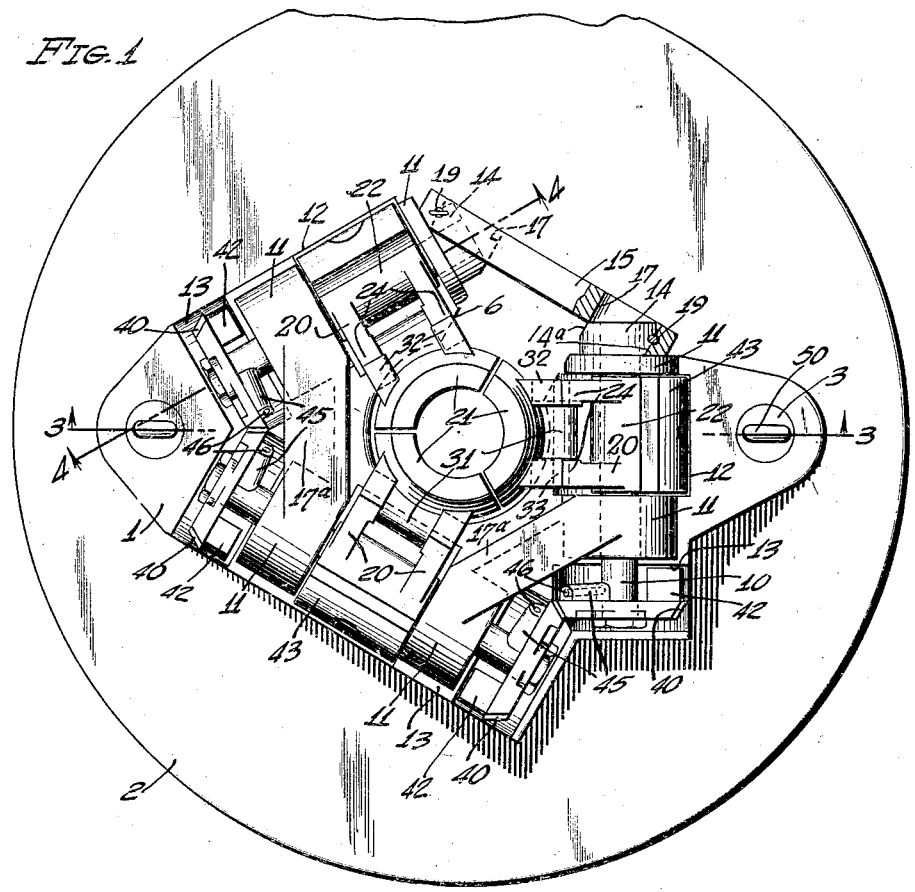
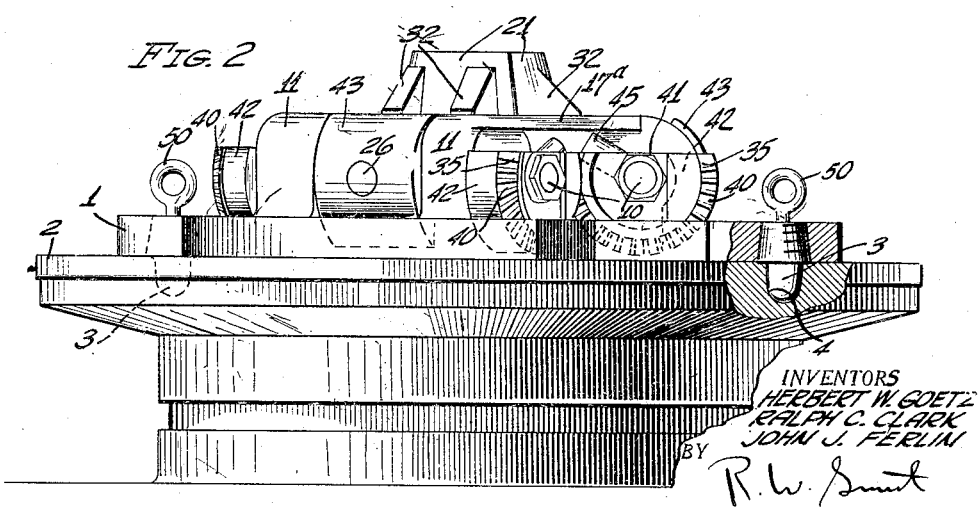
INVENTORS
HERBERT W. GOETZ
RALPH C. CLARK
JOHN J. FERLIN
BY
ATTORNEY May 5, 1931.  H. W. GOETZ ET AL  1,803,608
SPIDER
Filed March 26, 1928  2 Sheets-Sheet 2
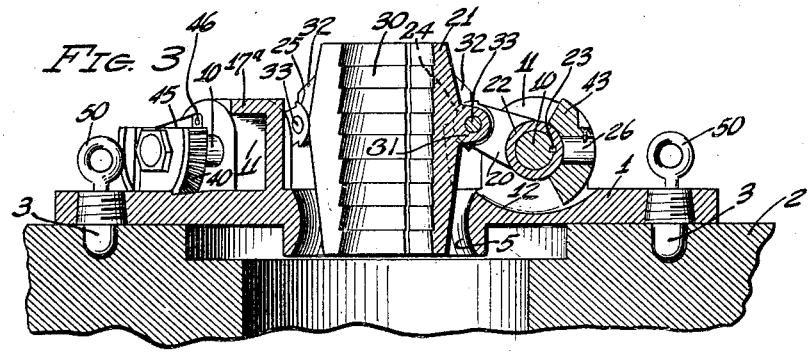
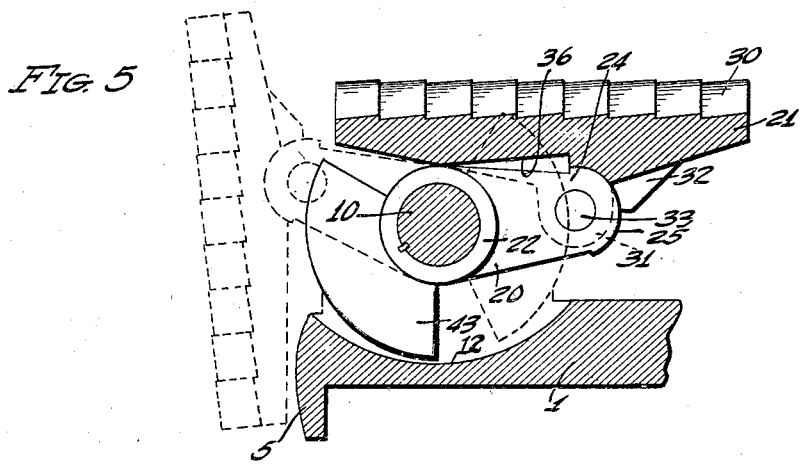
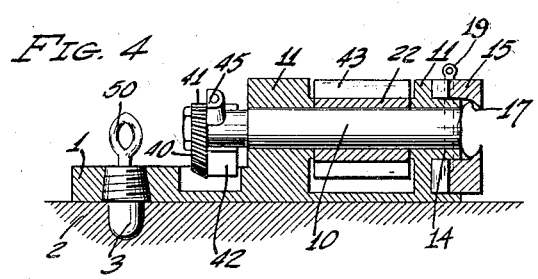
INVENTORS
HERBERT W. GOETZ
RALPH C. CLARK
JOHN J. FEERLIN
BY
ATTORNEY.

Patented May 5, 1931

1,803,608

UNITED STATES PATENT OFFICE

HERBERT W. GOETZ, OF ALHAMBRA, RALPH C. CLARK, OF LOS ANGELES, AND JOHN J. FERLIN, OF HUNTINGTON PARK, CALIFORNIA

SPIDER

Application filed March 26, 1928. Serial No. 264,691.

This invention relates to a spider adapted for use at the derrick floor of a well for temporarily holding any type of piping such as casing, tubing, drill pipe, sucker rods, etc., which it is desired to insert or withdraw from the well.

It is an object of the invention to provide a spider having a plurality of jaws for gripping the well piping, with the jaws so arranged as to provide a completely enclosed gripping annulus in order to equalize the gripping action and thereby prevent distortion of the piping and insure a reliable and positive supporting engagement.

It is a further object of the invention to provide a gripping action comprising at least a three-point engagement, with the plurality of gripping means dependently actuated so as to insure equalized gripping pressure against the piping from all directions.

It is a still further object of the invention to arcuately shift the gripping means to operative or inoperative position, with said arcuate movement so counterbalanced that the weight of the gripping means will immediately tend to accelerate their swing as soon as shifting to either operative or inoperative position is initiated.

It is a still further object of the invention to arrange the gripping jaws so that they will swing of their own weight to a position initiating engagement with the piping at the upper ends of the jaws as the latter are swung to operative position, with the jaws adapted to then swing to parallel position as the arcuate movement to operative position is continued, so that the jaws will finally grip the piping throughout the length of the jaws for producing uniform gripping pressure.

It is a still further object of the invention to mount the gripping jaws for swinging movement so that they are adequately supported without shearing action such as would tend to cause breakage, and to thus provide an extremely sturdy construction adapted to safely support the weight of any length of piping.

It is a still further object of the invention to arrange the gripping jaws for movement to clamping position on well piping without employing the usual wedging seating action such as tends to cause the jaws to stick in their operative position, with the arcuate swinging movement for the jaws as provided for in the present invention insuring ready release or clamping engagement on the well piping and the counterbalanced construction adapting the jaws for release or engagement by the exertion of minimum effort.

The foregoing and further objects of the invention will be readily understood from the following description of the accompanying drawings, in which:

Fig. 1 is a plan view of the invention with the jaws in operative position, and showing the closure plate for the spider partly in horizontal section.

Fig. 2 is a similar front elevation of the invention.

Figs. 3 and 4 are transverse sections on the lines 3—3 and 4—4 of Fig. 1 respectively.

Fig. 5 is a detail vertical section through one of the jaws and its operating connection, showing the jaw in inoperative position in full lines, and showing the position of the jaw as it approaches operative position in dotted lines.

In the drawings we have shown the invention adapted for mounting on a usual rotary table so as to grip rotary drill pipe, although it will be readily apparent that the spider may be adapted for mounting on any suitable support, as for example a well casing, and its jaws may be so constructed as to define an annulus for gripping any type of piping, as is usual in well tubing for example.

In the embodiment of the invention illustrated, the base of the spider is shown at 1 adapted for detachable mounting on a usual rotary table 2 by means of depending lugs 3 which are adapted for reception in the usual diametrically opposite boxes 4 provided in the rotary table; and the base 1 is provided with a central opening 5 through which the string of drill pipe is adapted to extend, with one side of the base preferably having an opening therethrough to the central opening as shown at 6, and through which the string of drill pipe is adapted to pass to permit the spider being mounted in operative position.

The spider provides at least a three point gripping engagement and for this purpose is provided in the present embodiment with three jaws and their corresponding operating connections. The operating connections each include a shaft 10 journaled on base 1 in upstanding bearing lugs 11, and the shafts of the three operating connections define a triangle surrounding the central opening 5 with adjacent ends of two of the shafts spaced apart the width of opening 6 as shown in Fig. 1, so as not to obstruct the free mounting of the spider on a string of drill pipe.

Each shaft 10 is preferably journaled in two of the bearing lugs 11, which are axially spaced at either side of the medial portions of the shafts, and the upper surface of base 1 is preferably recessed beneath the medial portion of each shaft as shown at 12 to permit free swinging movement of the operating connections which are fixed on the medial portions of the shafts. The upper surface of base 1 is also preferably recessed beneath each shaft end projecting beyond its bearing lug as shown at 13, except at the shaft ends which are transversely spaced by opening 6, and at these latter shaft ends the bearing lugs 11 preferably form axially projecting bearing collars 14 for the shaft ends with said collars adapted to detachably support a closure plate 15 for the opening 6. The closure plate has bores 17 opening therethrough perpendicularly to the faces of the closure plate and adapted to receive the collars 14 which may have their peripheries cut away angularly to the axes of the collars as shown at 14ª in order that the collars may be readily received in the bores 17. Vertically insertable locking pins 19 are adapted for reception in cooperating bores 19ª which extend transversely to the axes of collars 14 and are formed partly in the peripheries of said collars and partly in the peripheral walls of bores 17 as shown at the right of Fig. 1, so that withdrawal of the locking pins permits removal of plate 15, while insertion of the locking pins will lock the closure plate in place. Upstanding angular bracing ribs 17ª may be formed integral with base 1 and the proximate bearing lugs 11 for adjacent shaft ends 10, except at the shaft ends which are spaced by opening 6, and a sturdy and rigid construction is thus formed, which when closure plate 15 is removed may be readily laterally shifted onto a string of drill pipe by the latter passing through opening 6, and which when in operative position with closure plate 15 mounted on collars 14 and locked against disengagement by the pins 19, provides a completely enclosed annular structure surrounding the string of drill pipe which extends through the central opening 5.

The operating connections fixed on the medial portions of shafts 10 carry cooperating gripping jaws which when swung to operative position define a closed annular gripping means concentric with central opening 5 and adapted to engage the string of drill pipe extending therethrough, and when moved to inoperative position the gripping jaws disengage the string of drill pipe and are swung back to substantially horizontal position overlying the shafts 10 so that the string of drill pipe may be withdrawn from the well without obstruction by the jaws. The jaws with their operating connections are interchangeable units mounted on shafts 10, and a description of one of said units will therefore suffice.

Each unit preferably comprises a pair of arms 20 projecting from a collar 22 which is fixed on shaft 10 as shown at 23, with a jaw 21 journaled on bearing surfaces 25 at the extremities 24 of the pair of arms. As an instance of this arrangement the jaw is shown as an elongated arcuate structure with its concave surface transversey serrated as shown at 30 so as to provide a gripping engagement with drill pipe, and the convex surface of the jaw has a lug 31 projecting therefrom intermediate of its ends but preferably closer to its upper end, with said lug adapted for reception between the pair of arms 20. Concave bearing lugs 32 which project from the convex surface of the jaw structure at each side and above lug 31 are adapted to ride on the bearing surfaces 25 of the pair of arms and the jaw is held against displacement by a pin 33 extending through the arm ends 24 and the lug 31, but the weight of the jaw is not carried by this pin but is borne by the cooperating bearing surfaces 25—32, in order to eliminate shearing action at the pin 33.

In the present embodiment of the invention in which three gripping jaws 21 are employed, they each embrace an arc of substantially 120° in order that they may cooperate to define a closed gripping annulus surrounding the drill pipe which is to be held thereby, and by the mounting for the jaws as has been described it will be seen that by dependently rotating shafts 10 the jaws are adapted for dependent movement to operative position as shown in Fig. 3, or inoperative position shown in full lines in Fig. 5. Swinging movement to inoperative position may be limited as hereinafter described, and when in inoperative position the backs of the jaws preferably rest on the arms 20, and the jaws may be arranged so as to lie substantially horizontally when in such inoperative position, by suitably angularly recessing the convex surfaces of the jaws so as to form abutment surfaces 36 which rest upon the arms.

The shafts 10 are adapted for dependent rotation by providing rotary driving connections between the projecting ends of adjacent shafts, and for this purpose cooperating bevel gears 40 may be fixed on the ends of adjacent shafts except at the shaft ends which are spaced by opening 6, the said bevel gears being adapted for unobstructed rotation as a result of the recessing of base 1 beneath the same as shown at 13, and rotation of the gears being suitably stopped when jaws 21 are in inoperative position, as for example by distorting the threads of the meshing gears as shown at 35.

Segments of the gears are preferably cut away as shown at 41 in order to form unbalanced structures having their centers of gravity in vertical alinement and below the axes of the gears when the shafts 10 are so turned as to operatively position the jaws 21 as shown in Fig. 2, and the rear surfaces of the gears are preferably provided with segmental counterweights 42 which when the jaws 21 are in operative position have their centers of gravity below shafts 10 and at substantially diametrically opposite the arms 20 which project from the respective shafts. The jaws and their operating arms are preferably further counterweighted by arcuate counterweights 43 which are fixed on pins 26 projecting from collars 22 at such obtuse angles to the arms 20 that when the parts are disposed with jaws 21 in operative position as shown in Fig. 3, the pins 26 are substantially horizontal and the pairs of arms 20 are slightly inclined upwardly toward their swinging ends; and the counterweights 43 are adapted for unobstructed swinging movement with shafts 10 as a result of the recesses 12 provided in base 1.

Means are provided for manually rotating any one of the shafts 10 and thereby dependently turning all of the shafts as a result of their bevel gear driving connections, and for this purpose lugs 45 may project from the rear surfaces of gears 40 and are provided with bores 46, any one of which is adapted to receive a suitable hand lever (not shown). The bores 46 are preferably angularly disposed as shown in Figs. 1 and 2 so that the hand lever projecting from any one of said bores will be positioned for convenient manual engagement to rock the shafts 10 so as to swing jaws 21 from inoperative to operative position.

In operation the spider with its jaws swung back to inoperative position is lifted onto rotary table 2 by any suitable elevating mechanism mounted in the well derrick and adapted to engage suitable eyes 50 which may project upwardly from base 1 in alinement with lugs 3, and the closure plate 15 having been removed the spider may be shifted laterally onto a string of drill pipe by the latter passing through openings 6, and the spider is then fixed on the rotary table by lugs 3 received in bores 4, so that the string of drill pipe extends through the central opening 5, with the spider completely surrounding the drill pipe when closure plate 15 is replaced on collars 14 and locked by pins 19.

When it is desired to support the string of drill pipe by the spider in order that a length of the pipe which has been withdrawn from the well may be disconnected, a hand lever is inserted in one of the bores 46 and is manually shifted so as to rock the shafts 10 from the position shown in full lines to that shown in dotted lines in Fig. 5. It will be noted that immediately at the start and throughout said rocking movement of shafts 10 the jaws 21 and their operating arms 20 are nicely counterbalanced by the counterweights 42 and 43 so that the jaws may be shifted to operative position with minimum effort; and when the arms 20 assume the position shown in dotted lines in Fig. 5 the upper ends of jaws 21 tilt forwardly for initial engagement with the drill pipe, as a result of the relative position of the pivotal axes of the jaws at pins 33 and the center of gravity of the jaws below said pivotal axes.

With the jaws in this position the downward swinging movement of arms 20 is continued so that the jaws rock to parallel relation as shown in Fig. 3, thereby uniformly gripping the drill pipe throughout the length of their serrated surfaces 30 without the possibility of excessive gripping pressure when the jaws first engage the pipe, and when the weight of the string of pipe is placed upon the jaws the rocking movement of arms 20 is thereby continued until arrested by the jaws 21 tightly gripping the pipe. The parts are then in the position shown in Fig. 3, in which position it will be noted that subsequent elevation of the string of drill pipe will initiate rocking movement of arms 20 in the reverse direction to release the jaws, and that counterweights 42—43 are then so positioned as to immediately counterbalance the jaws and their arms so that they will be swung all the way back to inoperative position by simply the impetus imparted thereto by the initial elevation of the string of drill pipe.

We have thus provided a spider construction whereby gripping jaws may be swung to operative position with minimum effort and will be automatically returned to inoperative position when the string of pipe which is gripped thereby is subsequently elevated, the construction insuring uniform gripping action and dependent operation of the respective jaws with the gripping pressure applied uniformly throughout the length of the jaws, and the construction also providing for at least a three point uniformly spaced gripping action so as to accurately center the string of pipe in the gripping annulus which is formed and thereby maintaining a uniform radial gripping pressure for preventing distortion of the pipe.

We claim:

1. The combination of a base having a bore for passage of well piping, a plurality of gripping jaws, and arms pivoted at one end to the base and pivoted at their opposite ends to the respective jaws so that rocking movement of the arms will cause the jaws to engage or release the well piping, the said arms being adapted to rock to jaw releasing position projecting substantially horizontally rearwardly from their axes with the pivoted jaws resting substantially horizontally on the arms.

2. The combination of a base having a bore for passage of well piping, rock shafts journaled on the base, a driving connection between the rock shafts, a plurality of gripping jaws, arms projecting from the rock shafts and pivotally connected to the jaws at their swinging ends so that rocking movement of the shafts will cause the jaws to engage or release the well piping, the said shafts being adapted to rock to jaw releasing position with the arms projecting substantially horizontally rearwardly from the rock shafts and the pivoted jaws resting substantially horizontally on the arms.

3. The combination of a base having a bore for passage of well piping with an opening extending laterally from said bore through one side of the base, more than two gripping jaws adapted to define an annulus surrounding the well piping, rock shafts for the respective jaws journaled on the base clear of its lateral opening, meshing bevel gears on the rock shafts forming driving connections between the rock shafts clear of said lateral opening, and arms projecting from the rock shafts and pivotally connected to the respective jaws at their swinging ends so that rocking movement of the shafts will cause the jaws to engage or release the well piping.

4. In a spider for well piping, a support, a gripping jaw, a swinging arm pivoted at one end to the support and pivoted at its opposite end to the jaw, and means for swinging the arm so as to swing the jaw to operative or inoperative position, the arm being free to swing so that with the jaw in inoperative position the arm projects substantially horizontally rearwardly from its pivotal connection with the support, with the jaw resting substantially horizontally on the arm, and the jaw having a recess in its rear surface adapted to receive the arm when the jaw rests thereon in inoperative position.

5. In a spider for well piping, a support, a gripping jaw, a rock shaft mounted on the support, an arm projecting from the rock shaft and connected to the jaw for swinging the jaw to operative or inoperative position, and a counterbalance on the rock shaft at the side of its pivotal axis opposite to the projecting arm.

6. In a spider for well piping, a support, a gripping jaw, a rock shaft mounted on the support, a gear for turning the rock shaft, an arm projecting from the rock shaft and connected to the jaw for swinging the jaw to operative or inoperative position, and means on the gear for counterbalancing swinging movement of the jaw.

7. In a spider for well piping, a support, a gripping jaw, a rock shaft mounted on the support, an arm projecting from the rock shaft and connected to the jaw for swinging the jaw to operative or inoperative position, and a counterbalance on the rock shaft at the side of its pivotal axis opposite to the projecting arm and adapted to project substantially horizontally from said pivotal axis when the jaw is in operative position.

8. In a spider for well piping, a support, a gripping jaw, a rock shaft mounted on the support, an arm projecting from the rock shaft and connected to the jaw for swinging the jaw to operative or inoperative position, and a counterbalance on the rock shaft at the side of its pivotal axis opposite to the projecting arm and adapted to swing beyond vertical dead center with relation to said pivotal axis when the jaw is swung to inoperative position.

9. In a spider for well piping, a support, a gripping jaw, a rock shaft mounted on the support, an arm projecting from the rock shaft and connected to the jaw for swinging the jaw to operative or inoperative position, and a counterbalance on the rock shaft at the side of its pivotal axis opposite to the projecting arm and adapted to project substantially horizontally from said pivotal axis when the jaw is in operative position, the said counterbalance being adapted to swing beyond vertical dead center with relation to said pivotal axis when the jaw is swung to inoperative position.

10. In a spider for well piping, a support, a gripping jaw, a swinging arm pivoted at one end to the support and pivoted at its opposite end to the jaw, and means for swinging the arm so as to swing the jaws to operative or inoperative position, the arm being free to swing so that with the jaw in inoperative position the arm projects substantially horizontally rearwardly from its pivotal axis with the pivoted jaw resting substantially horizontally on the arm.

11. In a spider for well piping, a support, a gripping jaw, a swinging arm pivoted at one end to the support and pivoted at its opposite end to the jaw at a point intermediate of the length of the jaw and forming the only pivotal support for the jaw, the center of gravity of the jaw being so positioned with relation to said only pivotal support as to tend to swing the upper end of the jaw forwardly beyond the vertical, and means for swinging the arm so as to swing the jaw to operative or inoperative position.

In testimony whereof they affixed their signatures to this specification.

HERBERT W. GOETZ.
RALPH C. CLARK.
JOHN J. FERLIN.